United States Patent
Davies et al.

(10) Patent No.: US 6,816,730 B2
(45) Date of Patent: Nov. 9, 2004

(54) MESSAGE HANDOVER FOR NETWORKED BEACONS

(75) Inventors: Robert J. Davies, Horley (GB); Paul M. Fulton, Salfords (GB); Robert L. Blake, Crewe (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 592 days.

(21) Appl. No.: 09/954,652

(22) Filed: Sep. 18, 2001

(65) Prior Publication Data

US 2002/0034946 A1 Mar. 21, 2002

(30) Foreign Application Priority Data

Sep. 20, 2000 (GB) .............................................. 0023181

(51) Int. Cl.⁷ ................................................. H04Q 7/20
(52) U.S. Cl. ....................... 455/436; 455/936; 455/525; 455/67.11
(58) Field of Search ................................. 455/436, 437, 455/439, 442, 403, 402.2, 405, 414.1, 67.11, 525, 466

(56) References Cited

U.S. PATENT DOCUMENTS

| | | | | |
|---|---|---|---|---|
| 5,835,861 A | 11/1998 | Whiteside | ................... | 455/466 |
| 6,069,871 A | * 5/2000 | Sharma et al. | ............... | 370/209 |
| 6,075,990 A | * 6/2000 | Shin | ........................... | 455/440 |
| 6,195,552 B1 | * 2/2001 | Jeong et al. | ................. | 455/436 |
| 6,253,083 B1 | * 6/2001 | Hacena et al. | .............. | 455/437 |
| 6,430,200 B1 | * 8/2002 | Han et al. | .................... | 370/500 |
| 6,438,378 B1 | * 8/2002 | Kouno | ........................ | 455/439 |
| 6,571,279 B1 | * 5/2003 | Herz et al. | ................... | 709/217 |
| 6,754,484 B1 | * 6/2004 | Hiltunen et al. | ......... | 455/412.1 |

* cited by examiner

Primary Examiner—CongVan Tran
(74) Attorney, Agent, or Firm—Dicran Halajian

(57) ABSTRACT

A data transmission system comprises a first (12) and two or more second (13, 14, 15) beacon devices interconnected (11) as a cluster capable of wireless message transmission, and at least one mobile device (10) capable of receiving such message transmissions. The first beacon (12) is arranged to broadcast a series of inquiry messages (INQ) according to a first communications protocol, such as Bluetooth. The mobile device (10) detects such inquiry messages and replies with an identifier for itself. The link (A) from the first beacon device is then re-established between a selected one (14) of the second beacon devices. When a handover trigger event occurs, paging and page response messages are used to select a further second beacon device (13) and transfer the communications link (C) thereto.

17 Claims, 4 Drawing Sheets

MESSAGE HANDOVER FOR NETWORKED BEACONS

Figure 1:
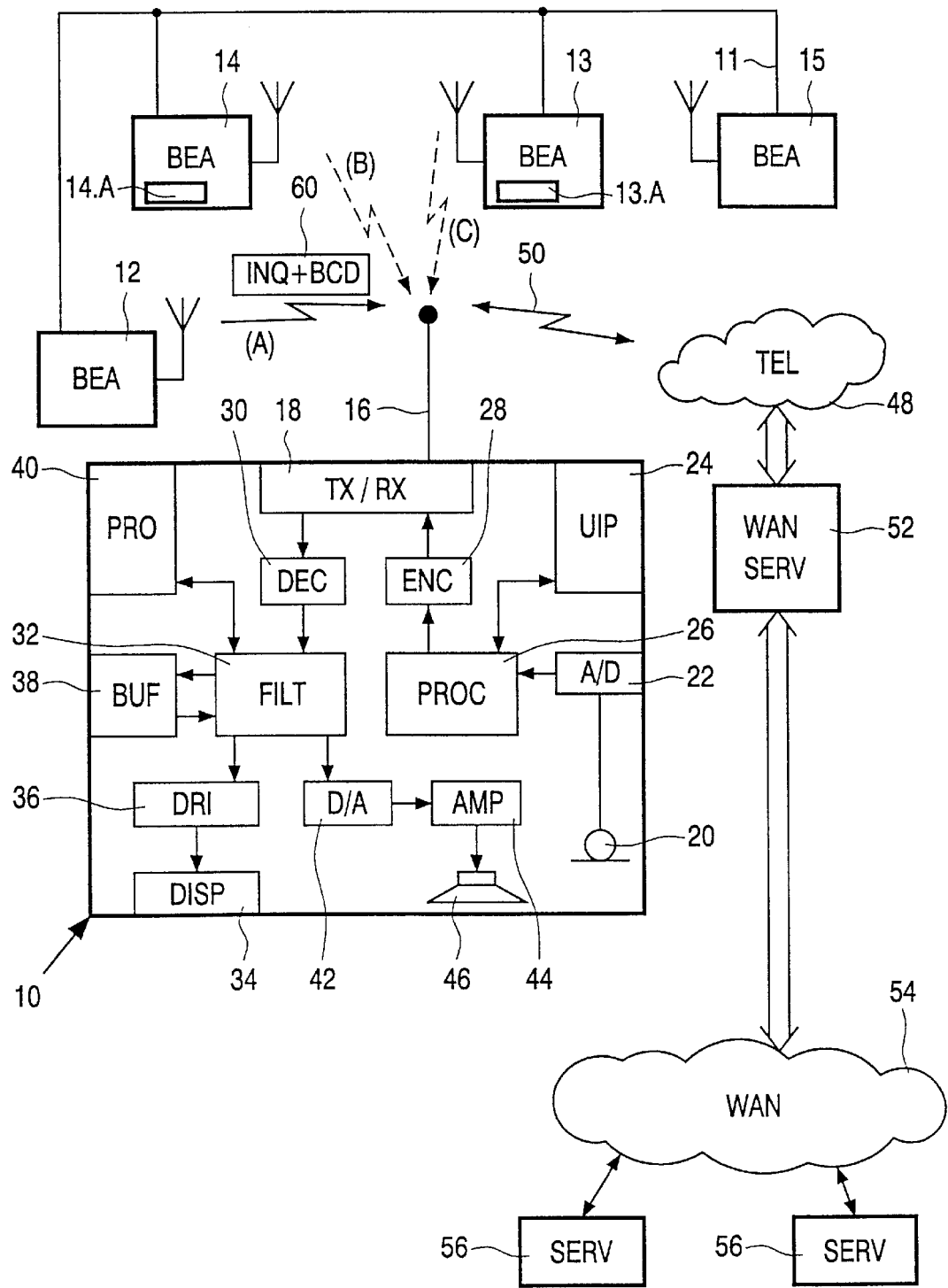

The present invention relates to data delivery and communications systems comprising one or a plurality of mobile data processing or communications devices interacting with one or several groups or clusters of networked data delivery and/or transmission beacons.

An example of a mobile data processing device interacting with a fixed device is given in U.S. Pat. No. 5,835,861 which describes the use of wireless telephones with a beacon in the form of an electronic advertisement billboard. The user of a wireless telephone obtains the telephone number of a vendor by activating his/her wireless telephone to transmit a prompt signal to an active advertisement source and to receive from the advertisement source a response signal containing the telephone number of the advertising vendor. The telephone number can then be used to automatically place a call to that vendor via the public switched telephone network. Alternatively, the telephone number can be stored for use later on. This arrangement can be used to place a call to a vendor without having to either memorise the telephone number or to write it down. The signals between the billboard and the caller can be transmitted as modulated infrared (IR) signals.

It will be recognised that an important requirement for such mobile data processing or communications devices is that they quickly and efficiently gather data from beacons such that the user is not required to undertake actions such as staying close to a beacon whilst contact is established between portable device and beacon, nor having to specifically initiate interaction (as is the case with the above-mentioned system in U.S. Pat. No. 5,835,861).

As is described in our pending United Kingdom patent application no. 0020101.2 (PHGB000112), the existing methodology for implementing a radio beacon is to perform a two-step connection process, commencing with the discovery of devices followed by the actual transmission of the information using the same device. Bluetooth, one of the technologies/protocols available for building such systems, requires that the discovery phase is completed before a transmission can take place. When used in a dynamic mobile environment, the time this process takes can often be longer than the actual time the device is in range, causing the information not to reach the client.

Due to the mobility of the clients and the typically small range of beacons, data delivery systems will typically be provided via a networked cluster (or several clusters) of beacons. In consequence, it is not just the time taken for a transaction to be performed that is important since there is still the likelihood that the client will be out of range of a given beacon and will not have received all the service information.

It is therefore an object of the invention to provide a system for the delivery of data via beacons whereby the transfer of an established link between a first beacon and mobile device to between a second or further beacon and a mobile device occurs relatively simply and without excessive power drain on the mobile device.

In accordance with a first aspect of the present invention there is provided a method for enabling the user of a mobile data processing device to perform a service interaction with a cluster of beacon devices containing a first and plural second beacon devices capable of wireless message transmission, wherein:

a first beacon broadcasts a series of inquiry messages according to a first communications protocol;

the users mobile device, on detecting such inquiry messages, replies with an identifier for the mobile device;

the first beacon device transmits a received identifier to a selected second beacon device;

the selected second beacon and mobile device establish a communications link for performance of said service interaction when triggered by the second beacon receiving the mobile device identifier; and on the occurrence of a handover trigger event, as determined by at least one of the selected second beacon and mobile device, a further second beacon device is selected and the communications link to the mobile device is transferred to it from the originally selected second device.

The step of transferring the communications link preferably involves the setting up of a second communications link in parallel with the first, and the selecting of which of the two links provides better results according to predetermined criteria, with the step of transferring the link to the further second beacon device only being undertaken if the link thereto provides said better results, and dropping the link not providing the better results. The step of setting up the second communications link may involve duplicating the data paths from the existing communications link.

Alternately, the step of transferring the communications link may commence with the deliberate or involuntary dropping of an existing communications link, followed by the selecting of a further second beacon device, setting up a new communications link thereto, and switching data paths to the new communications link.

In either of the above schemes, the further second beacon device may be selected following transmission of paging messages from at least some of the plural second beacon devices with a subsequent response message transmitted by the mobile device.

The above-mentioned handover trigger event may be deemed to occur when detected errors in a transmitted message exceed a predetermined level, when signal to noise ratio in a message received at one of a beacon or mobile device exceeds a predetermined threshold level, or when signal strength received at one of a beacon or mobile device drops below a predetermined threshold level.

Also in accordance with the present invention there is provided a data transmission system comprising a first and two or more second beacon devices interconnected as a cluster capable of wireless message transmission, and at least one mobile device capable of receiving such message transmissions, wherein said first beacon is arranged to broadcast a series of inquiry messages according to a first communications protocol, wherein said at least one mobile device is arranged to detect such inquiry messages and reply with an identifier for the mobile device, wherein said first beacon device is arranged to transmit a received identifier to a selected one of said two or more second beacon devices, wherein said selected second beacon and mobile device are configured to perform a service interaction when triggered by said selected second beacon receiving the portable device identifier, at least one of the selected second beacon device and mobile device is configured to identify when a handover trigger event occurs and, on detection, to select a further second beacon device and transfer the communications link thereto from the originally selected second beacon device. In a preferred implementation, the said first communications protocol comprises Bluetooth messaging.

Still further in accordance with the present invention there is provided a communications infrastructure for use in the above communications system, and a mobile device for use in the system, as defined in the claims hereinafter, the disclosure of which is incorporated herein by reference and to which the reader is now directed. Further features and advantages of the present invention are also recited in the attached claims, the disclosure of which is incorporated herein by reference, and to which the reader is now directed.

Preferred embodiments of the invention will now be described, by way of example only, and with reference to the accompanying drawings, in which:

FIG. 1 is a block schematic diagram of a cluster of beacons and a portable device suitable to embody the invention; and FIGS. 2 to 5 are flow charts illustrating the procedure for transferring an established communications link from one beacon to another.

In the following description we consider particularly a system which utilises Bluetooth protocols for communication of messages from one or a series of beacons to a portable device (whether telephone, PDA or other) although, as will be recognised, the present invention is not restricted to Bluetooth devices, and is applicable to other communications arrangements, in particular frequency hopping systems FIG. 1 is a block schematic diagram of a portable data processing device in the form of mobile telephone 10 in use with a cluster of low power, short range base stations or beacons 12, 13, 14, 15 interconnected by a secure data channel 11. One or more of these beacons may include data processing and/or control logic circuitry 13A, 14A capable of determining when a so-called handover event occurs, as will be discussed hereinafter. Such an arrangement may be used in places like shopping malls or museums to provide location-specific information such as local maps, information on nearby shops, restaurants, exhibits and so on, with a beacon downloading information keys to a mobile device. An information key is a small data object that provides a reference to a source of full information, and it is in the form of a number of predetermined fields, one of which will contain a short piece of descriptive text presented to a user. Another field will be a pointer or address (of some form) to a further data source, for example a URL or telephone number. Other supplementary fields may control how the data is presented to a user and how the address may be exploited. A beacon will generally broadcast cyclically a number of these keys, each typically relating to a different service although, as will be recognised, waiting for the appropriate key can sometimes be a time-consuming business.

The user's mobile device 10 comprises an aerial 16 coupled with transceiver stage 18 for the reception and transmission of messages. Outgoing messages result from user input to the telephone, either audio input via microphone 20 and A/D converter 22 or other data input via the keypad or other input means 24. These inputs are processed to message data format by signal and data processing stage 26 and converted to transmission format by encoder 28 before being supplied to the transceiver stage 18.

Messages received via the aerial 16 and transceiver 18 are passed via a decoding stage 30 to a filtering and signal processing stage 32. If the data carried by the message is for presentation on a display screen 34 of the telephone, the data will be passed to a display driver 36, optionally after buffering 38, with the driver formatting the display image. As will be recognised, the display 34 may be a relatively simple low-resolution device, and the conversion of received data to display data may be carried out as a subset of the processing stage 32 functionality, without the requirement for a dedicated display driver stage.

Where the message is carrying data from one of the beacons 14, the telephone has the ability to filter the information received according to prestored 40 user preferences and the user is only alerted (i.e. the information will only be retained in buffer 38 and/or presented on screen 34) if comparison of stored preference data and subject matter indicators in the message indicate that an item of data of particular interest has been received.

For conventional audio messages, the audio data is output by the filter and processing stage 32, via D/A converter 42 and amplifier 44 to an earphone or speaker 46. Receipt of such messages from the telephone network 48 is indicated by arrow 50: the telephone network 48 also provides the link from the telephone 10 to a wide-area network (WAN) server 52 and, via the WAN 54 (which may be the internet), to one or more remote service providers 56 providing a source of data for the telephone 10.

Communication between the mobile or client device (telephone 10) and the beacons 12–15 takes two forms: 'push' and 'pull'. In 'push' mode, inquiry information is broadcast by the beacon 12 to all portable terminals 10 in the form of a short 'key' indicated at 60. The telephone 10 responds to the inquiry key by sending an identifier for itself to the first beacon 12, which then transfers the interaction to a selected one of the second beacons 14 whilst the first 12 continues to broadcast inquiry keys.

Sometimes the user will wish to obtain more information than is contained in the keys. Here, 'pull' mode allows a user to set up a connection with a server 56 and actively request information to pull down into the terminal 10. This mode is therefore typically interactive.

As mentioned above, one beacon 12 is labelled as an 'inquirer' beacon and it to sends out Bluetooth inquiry messages constantly. The other beacons 13, 14, 15 are labelled as 'interactor' beacons and allowed to communicate with terminals 10 on a one-to-one basis on request. Here, the inquiry procedure is performed by the inquirer beacon 12 and the paging procedure by one or more of the interactor beacons 14. By delegating the functions this way, it is possible to save a considerable amount of time that would otherwise be lost in attempts to join piconets.

It is likely that telephone 10 will move whilst the communications link (identified at B) to the interactor beacon 14 is active, to such an extent that the telephone 10 moves out of range. To identify a suitable further beacon for the communications link to be handed over to, when a handover event occurs, paging messages and responses thereto are used to identify a suitable further interactor beacon 13.

For voice traffic and, ideally, A/V links, the handover should be made in a seamless manner imperceptible to the user, and the best way to achieve this is to establish the new link before dropping the old one, such that two links are temporarily active simultaneously. The (possibly bidirectional) data stream can be run in parallel over the links whilst the best one is identified (according to predetermined quality criteria such as signal strength, error rates or signal to noise ratios). Following the identification, the better quality link is retained and the poorer quality one released.

Figure 2:
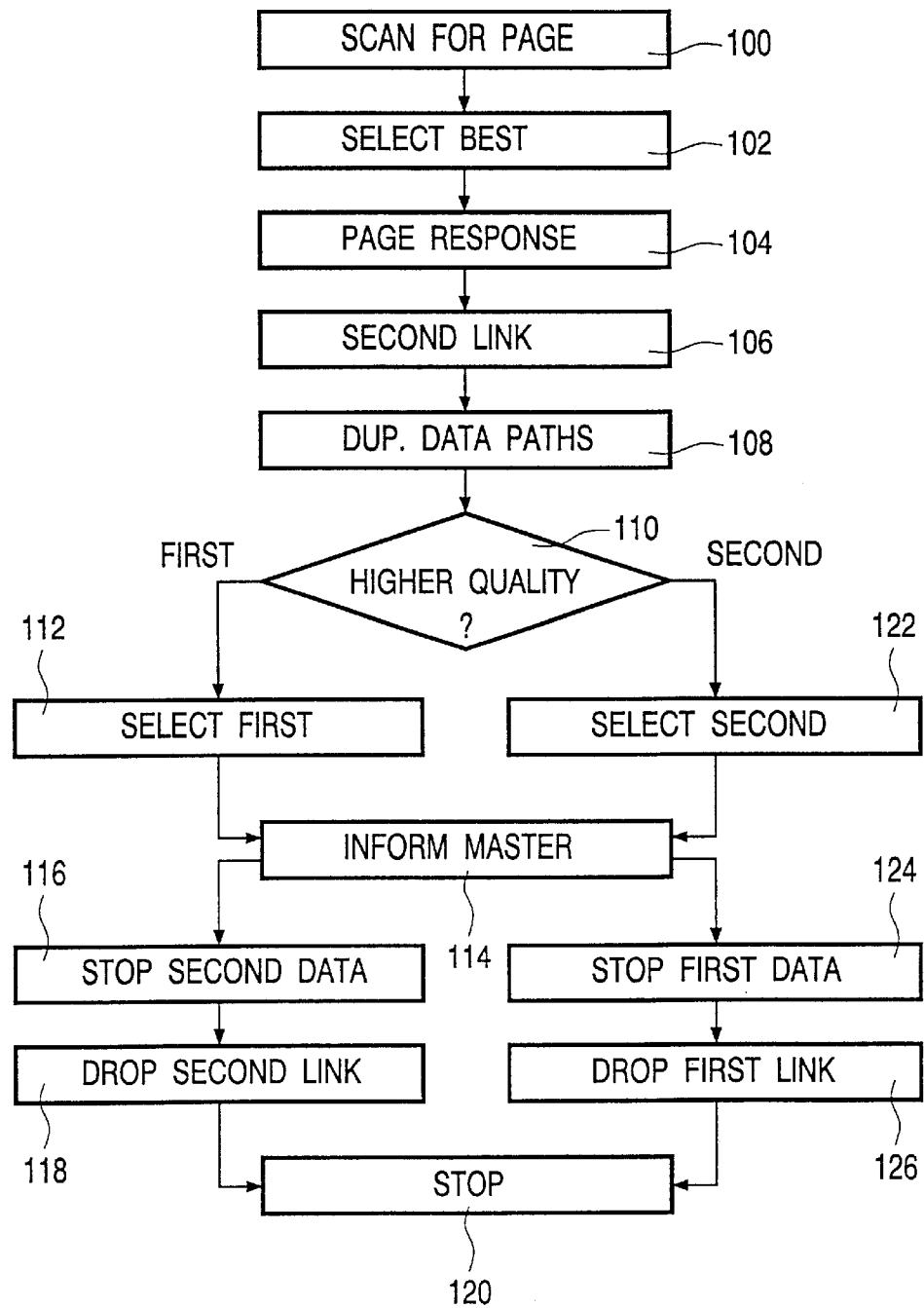

The flowchart of FIG. 2 gives an example procedure at the mobile device 10, comprising the steps:

Scan for Page messages 100.

Select best cell 102 and issue Page response 104.

Set up second link (C; FIG. 1) 106.

Duplicate data paths on new link 108.

Compare quality of two links 110.

Select better link 112 or 122, inform master 114, switch off data path from worse link 116 or 124.

Release the worse link 118 or 126, and end 120.

Figure 3:
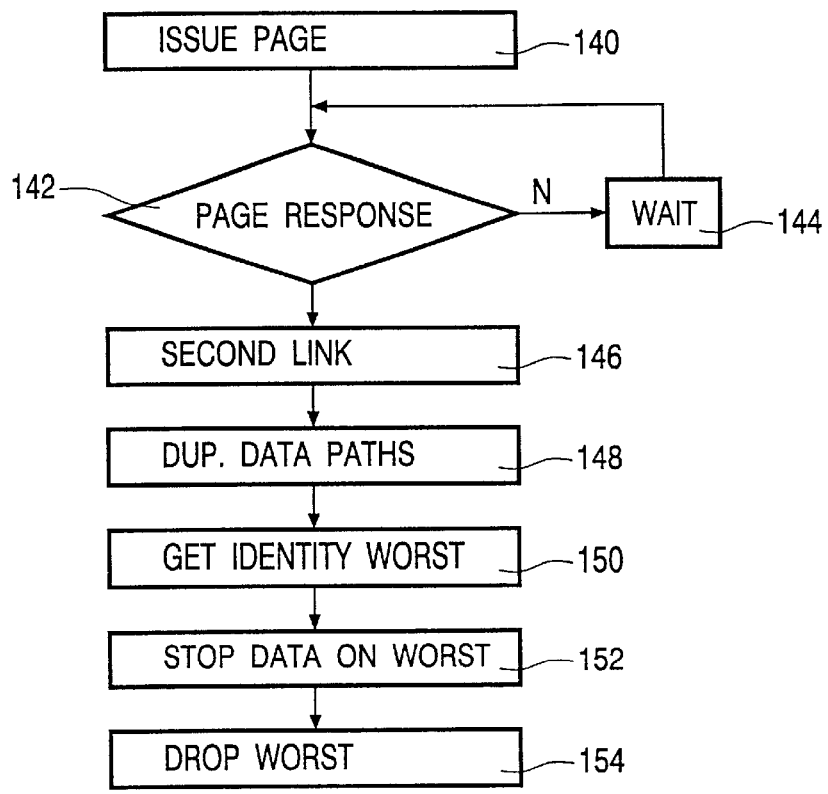
Figure 4:
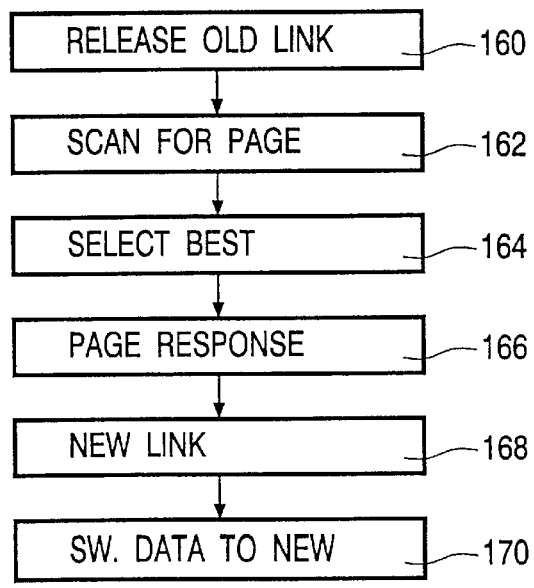

A procedure for the cluster of beacons is shown in the flowchart of FIG. 3, and comprises:

Issue Page messages 140 (indicating handover) at all cells in the cluster or nearby clusters except for the current cell Check for receipt of Page response and wait in the absence of a response 142, 144.

On receipt of Page response, set up second link 146.

Duplicate data paths on new link 148.

Get (or otherwise establish) the identity of the worst link from the mobile device 150.

Switch off data path from worst link 152.

Release the worse link 154.

The comparison to identify best/worst quality link can be performed by a master station of the system instead of the slave terminal but should take place within a certain time. The link release can be initiated by either side once a decision has been made and communicated to the other side. If necessary, the entire procedure can be repeated until a satisfactory channel has been obtained.

Data calls will not normally need a seamless handover: it is therefore acceptable to release the old link before setting up the new. A non-seamless handover might also be the result when a voice or AN link is dropped involuntarily. The procedures will generally be simpler, with a general (but non-binding) procedure at the terminal for this being as follows (with reference to flowchart FIG. 4):

Release old link (may be system-dictated or involuntary i.e. through loss of communication path) 160.

Scan for Page messages 162.

Select best cell 164, and issue Page response 166.

Set up new link 168.

Switch data paths to the new link 170.

A corresponding procedure for the beacon network is (referring to the flowchart of FIG. 5):

Release old link (may be system-dictated or involuntary as above) 180

Issue Page messages at all cells in the cluster or nearby clusters except for the current cell, 182 wait for receipt of Page response 184, 186.

On receipt of Page response, set up new link 188.

Switch data paths to new link 190

A handover procedure can be triggered by either side on determination of a handover event occurring. A seamless handover will generally be triggered by decreasing link quality as measured by either the fixed beacon (master) or the portable device (slave). The master may issue a request to the fixed network, causing the network to begin the procedure described with reference to FIG. 3. The master will then inform the slave by some means in the downlink or will assume that the slave will be scanning for Page messages anyway. Alternatively, if the slave detects poor link quality, it may issue a handover request in the uplink or it may issue an Inquiry response message to an Inquiry beacon with the Message Reason field set to {link handover request} (as described in greater detail in our co-pending UK patent application no. 0023182.9 entitled "Low level Mobility Management Procedures").

Figure 5:
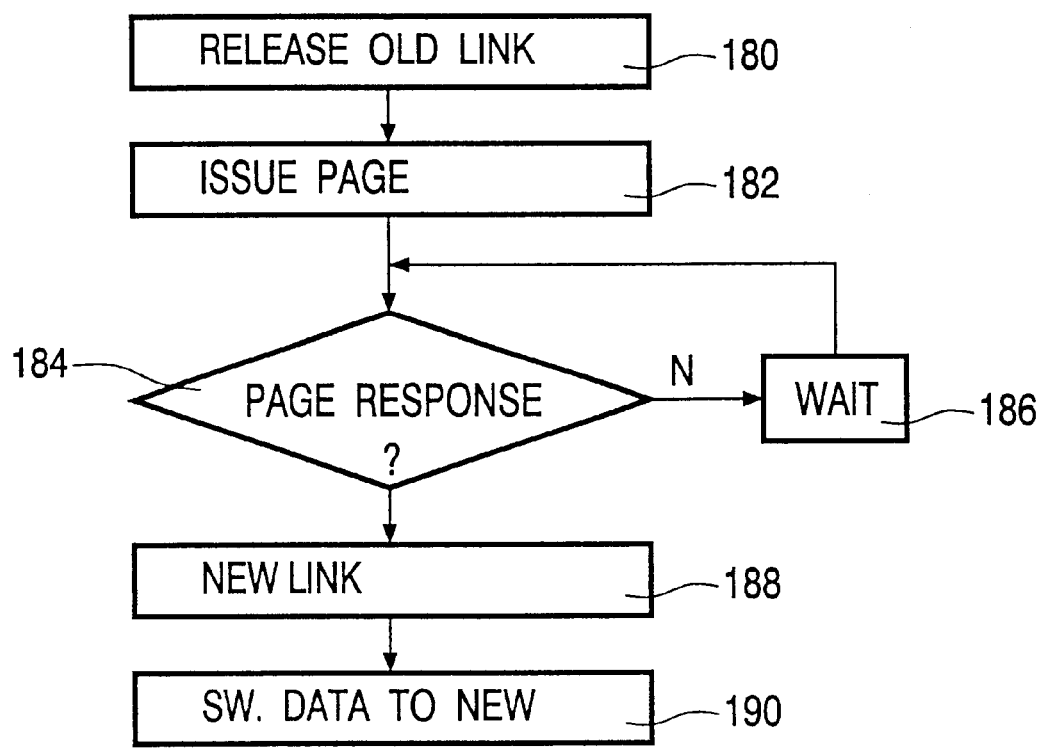

Involuntary loss of a link may cause the fixed network to begin the procedure of FIG. 5 automatically or when an Inquiry response {link handover request} message is received from the slave terminal. Purposeful non-seamless handover is initiated by either side issuing link release with the reason set to {link handover}.

From reading the present disclosure, other modifications will be apparent to persons skilled in the art. Such modifications may involve other features which are already known in the design, manufacture and use of fixed and portable communications systems, and systems and components for incorporation therein and which may be used instead of or in addition to features already described herein.

What is claimed is:

1. A method for enabling the user of a mobile data processing device to perform a service interaction with a cluster of beacon devices containing a first and plural second beacon devices capable of wireless message transmission, wherein:

a first beacon broadcasts a series of inquiry messages according to a first communications protocol;

the users mobile device, on detecting such inquiry messages, replies with an identifier for the mobile device;

the first beacon device transmits a received identifier to a selected second beacon device;

the selected second beacon and mobile device establish a communications link for performance of said service interaction when triggered by the second beacon receiving the mobile device identifier; and on the occurrence of a handover trigger event, as determined by at least one of the selected second beacon and mobile device, a further second beacon device is selected and the communications link to the mobile device is transferred to it from the originally selected second device.

2. A method as claimed in claim 1, wherein the step of transferring the communications link involves the setting up of a second communications link in parallel with the first, selecting which of the two links provides better results according to predetermined criteria, only transferring the link to the further second beacon device if the link thereto provides said better results, and dropping the link not providing the better results.

3. A method as claimed in claim 2, wherein the step of setting up the second communications link involves duplicating the data paths from the existing communications link.

4. A method as claimed in claim 1, wherein the step of transferring the communications link commences with the dropping of an existing communications link, selecting a further second beacon device, setting up a new communications link thereto, and switching data paths to the new communications link.

5. A method as claimed in claim 2, wherein the further second beacon device is selected following transmission of paging messages from at least some of the plural second beacon devices and a response message is transmitted by the mobile device.

6. A method as claimed in claim 1, wherein a handover trigger event occurs when detected errors in a transmitted message exceed a predetermined level.

7. A method as claimed in claim 1, wherein a handover trigger event occurs when signal to noise ratio in a message received at one of a beacon or mobile device exceeds a predetermined threshold level.

8. A method as claimed in claim 1, wherein a handover trigger event occurs when signal strength received at one of a beacon or mobile device drops below a predetermined threshold level.

9. A data transmission system comprising a first and two or more second beacon devices interconnected as a cluster capable of wireless message transmission, and at least one mobile device capable of receiving such message transmissions, wherein said first beacon is arranged to broadcast a series of inquiry messages according to a first communications protocol, wherein said at least one mobile device is arranged to detect such inquiry messages and reply with an identifier for the mobile device, wherein said first beacon device is arranged to transmit a received identifier to a selected one of said two or more second beacon devices, wherein said selected second beacon and mobile device are configured to perform a service interaction when triggered by said selected second beacon receiving the portable device identifier, at least one of the selected second beacon device and mobile device is configured to identify when a handover trigger event occurs and, on detection, to select a further second beacon device and transfer the communications link thereto from the originally selected second beacon device.

10. A system as claimed in claim 9, being configured to set up a second communications link in parallel with the first, including means to determine which of the two links provides better results according to predetermined criteria, said means transferring the link to the further second beacon device if the link thereto provides said better results, and dropping the link not providing the better results.

11. A system as claimed in claim 9, being configured on the dropping of an existing communications link, to select a further second beacon device, including means operable to set up a new communications link thereto, and to switch data paths to the new communications link.

12. A system as claimed in claim 9, wherein said first communications protocol comprises Bluetooth messaging.

13. A communications infrastructure for use in the communications system of claim 9, the infrastructure comprising first and two or more second beacon devices and an interconnection therebetween, said beacon devices being capable of wireless message transmission to said at least one mobile device, wherein said first beacon is operable to broadcast a series of inquiry messages according to a first communications protocol, to detect any response messages containing a mobile device identifier for said mobile device, wherein said first beacon device is arranged to transmit a received identifier to a selected one of said two or more second beacon devices, wherein said selected second beacon is configured to perform a service interaction with a mobile device when triggered by said selected second beacon receiving the mobile device identifier, the selected second beacon device is configured to identify when a handover trigger event occurs and, on detection, to select a further second beacon device and transfer the communications link thereto from the originally selected second beacon device.

14. A communications infrastructure as claimed in claim 13, wherein said interconnection between the first and second beacon devices comprises a secure data channel.

15. A communications infrastructure as claimed in claim 13, being configured on the occurrence of a handover event to perform the steps of:
  issuing paging messages from beacons close to that at which the current link is established;
  on receipt of a paging response at a second beacon, setting up a second data link to that beacon;
  identifying the better quality of the two links according to predetermined criteria; and
  dropping the lower quality link.

16. A communications infrastructure as claimed in claim 13, being configured on the releasing of an existing communications link to a second beacon to perform the steps of:
  issuing paging messages from beacons close to that at which the released link had been established;
  on receipt of a paging response at a second beacon, setting up a second data link to that beacon.

17. A mobile device for use in a data transmissions system as claimed in claim 9, the device being configured on the occurrence of a handover event to perform the steps of:
  scanning for paging messages;
  on the basis of received paging messages selecting a sending beacon and transmitting a page response thereto;
  setting up a second link to the sending beacon;
  determining which of the existing and second links provides best quality according to predetermined criteria; and
  releasing the lower quality of the two links.

* * * * *